United States Patent [19]
Fisk et al.
[11] 3,890,472
[45] June 17, 1975

[54] TRANSPARENT TIME-DIVISION PULSE-MULTIPLEX DIGITAL ELECTRIC SIGNAL SWITCHING CIRCUIT ARRANGEMENT

[75] Inventors: Dale Edward Fisk, San Jose; Merle Edward Homan, Los Gatos, both of Calif.

[73] Assignee: International Business Machines Corporation, Armonk, N.Y.

[22] Filed: June 3, 1974

[21] Appl. No.: 475,683

[52] U.S. Cl........... 179/15 AW; 178/50; 179/15 AT; 179/15 BA; 179/15 BV; 328/34

[51] Int. Cl.[2] ............................................ H04J 3/06

[58] Field of Search..... 179/15 AW, 15 BA, 15 BV, 179/15 AT; 178/50; 328/34, 36

[56] References Cited

UNITED STATES PATENTS

| | | | |
|---|---|---|---|
| 3,535,450 | 10/1970 | Vollmeyer | 178/50 |
| 3,691,464 | 9/1972 | Dayton | 179/15 BA |

*Primary Examiner*—David L. Stewart
*Attorney, Agent, or Firm*—George E. Roush

[57] ABSTRACT

Bilevel or bistatic digital electric signals are transmitted directly through a time division multiplexing (TDM) switching component asynchronously of the TDM clocking pulse train. A pulse duration modulated (PDM) electric signal or like wave is converted to a pulse amplitude modulated (PAM) electric wave having amplitude and timing components indicating a predetermined relationship to the TDM sampling period. The input PDM wave is amplitude limited by conventional circuitry and phase relationship is indicated by a ramp wave generator or a digital counter with the slope of the ramp wave or the counting rate proportional to the sampling period. Other forms of analog-to-digital converter circuitry may be substituted. The converted PAM electric wave is then passed through the switching component in conventional manner. Thereafter, the switched PAM electric wave is analyzed for reconstructing the original PDM electric signal wave. Complementary circuitry is preferably used for regenerating the signal. The upper limit on the data rate corresponds to one transition of the input electric signal to one time division sampling period of the TDM switching component.

10 Claims, 5 Drawing Figures

TRANSPARENT TIME-DIVISION PULSE-MULTIPLEX DIGITAL ELECTRIC SIGNAL SWITCHING CIRCUIT ARRANGEMENT

DESCRIPTION OF THE INVENTION

The instant application stems from the same endeavors that produced the copending U.S. patent application, Ser. No. 475,682 of Dale Edward Fisk, Merle Edward Homan, Charles Laurie Meiley, Zack Dwayne Reynolds, Robert Vernon Watkins, and Fritz S. Wiedmer, filed on the same day as the instant application for "Electric Signal Exchange Switching Circuit Arrangement".

The invention relates to circuitry for communications systems having electric circuit switching components through which electric signals are translated for distribution among a multiple of terminals, and it particularly pertains to input and output electric circuitry interfacing between the incoming electric signal communication lines and the switching component, and interfacing between the switching component and the outgoing electric signal transmission lines.

The prior art is replete with communication circuit switching arrangements. The subject has been of interest for decades, extending over nearly a century. Electronic solid state electric switching circuits have come to the forefront in the last two decades. A good example of such a switching circuit is described in the above-mentioned copending U.S. patent application, Ser. No. 475,682. It is desired that general purpose digital switching systems have electric signal paths established between two subscribers with the characteristics of "hard" wired connections even though such are practically out of the question. In the vernacular, engineers frequently refer to a circuit having the desirable features enumerated as a "transparent" circuit. Space division switching systems exhibit this feature, while time-division multiplex (TDM) switching systems do not. TDM switching systems are usually arranged for transmitting and receiving dependence on a synchronizing signal or clocking pulse train. A digital waveform as appearing at the switching component must be interpreted as digital values and buffered to be available for transmission through the TDM switch component without distortion. The digital data delivered by the switching component is again buffered and encoded into a waveform suitable for further transmission. Prior art circuit arrangements of the type suitable for transmitting data through disturbed electric communications channels are to be found in the following U.S. Pat. Nos.

| | | | |
|---|---|---|---|
| 3,299,204 | 1/1964 | Cherry et al | 178–6 |
| 3,691,464 | 9/1972 | Dayton et al | 325–55 |
| 3,701,144 | 10/1972 | Fineran et al | 340–347 AD |

These patented circuit arrangements are centered about analog-to-digital converting circuits, each of which is arranged in accordance with performance based on the classical Nyquist theorem which states that the sampling rate must be at least twice that of the data rate. While these circuit arrangements are the closest to those of the instant invention insofar as the applicant is aware, the structures are necessarily different because the basic modes of operation are different.

According to the invention, the objects indirectly referred to above and those which will appear hereinafter are attained in a time-division pulse-multiplex digital electric switching circuit arrangement having asynchronously operating input circuitry, switching component circuitry, and output circuitry. Asynchronous operation is effected by generating a manifestation of phasing in the input circuit, passing that manifestation through the switching component along with the data, and regenerating the data passing the switching component in accordance with the phasing manifestation passing the switching component.

According to the invention, bilevel or bistatic signals are translated through TDM switching component circuitry asynchronously of the timed operation of the latter with interfacing circuitry of operational characteristics related to those of the switching circuitry interposed between subscriber lines. The signal from a calling line is preferably passed through a regenerating circuit for limiting the amplitude excursions within predetermined values and eliminating the effects of spurious excursions that may occur. The PDM signal is then converted to a TDM/PAM signal having range and phase indicating components. The range component indicates the direction of the excursion from the previous sample while the phase component indicates the time relationship between the transitions of the PDM signal and the timing pulses triggering the operation of the switching component. The former is extracted from a portion of the regenerated signal. The latter is generated in response to triggering on each transition of the PDM signal. In one arrangement, the PDM signal transition is used to start a ramp voltage wave generating circuit. The ramp voltage generator is arranged to produce the ramp wave in a time period substantially equal to the timing period of the switching component circuitry. Preferably, with such circuitry, the thresholding values of the bistatic circuit also limits the duration of the ramp. The two components are summed in conventional circuitry for application to the switching component.

A sample-and-hold circuit of conventional form comprises the input circuit of the circuitry interfacing the switching component to the called line. The TDM sample indicates the range and phase from the standpoint of the timing impulse to the last transition time of the PDM signal as reflected by the signal passing the switch component. The TDM sample initiates a phase indicating component that with the TDM sample is summed and applied to a phase detecting circuit. The latter triggers a signal regenerating circuit for reproducing the original PDM signal wave delayed by one timing period. Slight variations in the timing relationship will not adversely affect the signal translation. Should a transition coincide with a timing impulse, a single dropout is the worst that can occur; this is not of serious consequence as the subsequent TDM sample will correct the output.

Counting circuitry is contemplated for alternate versions of the range and phase indicating circuit components. Conventional analog-to-digital and digital-to-analog converting circuitry can be employed as well. In any case, it is required that the switching element pass the digital representation of range and phase from input circuitry to output circuitry.

In one specific circuit arrangement according to the invention, incoming PDM data from a communications transmission is applied to a buffering circuit for limiting the amplitude if necessary. The buffering circuit is connected to an operational amplifying circuit for converting the data into equal positive and negative component signals. The component signals are applied to a ramp-generating circuit for initiating an ascending or descending ramp voltage wave at each data transition. The slope of the ramp wave generated is determined by the resistance-capacitance element time constant of the circuit and a voltage limiting constant in the form of the emitter-base breakdown voltage of the semiconductor amplifiers. The ramp period is preferably made equal to the period of the TDM switching pulse train. The ramp voltage is then combined with the data signal and applied to an operational amplifying circuit, then the combined signal is transmitted to the TDM electronic switching component, preferably through a buffering and driving circuit of conventional form. After passing through the switching component, the information is applied to a zero-order holding circuit which is arranged to hold the signal from the switching component for one sampling period. Zero-crossing points of the data sample are detected in a pair of comparator circuits and a data latch is set or reset accordingly. An operational amplifier connected to the data latching circuit converts the output thereof to equal positive and negative data signals for application to a ramp generating circuit. The ramp generating circuit produces an ascending or a descending ramp voltage at each data signal transition. Preferably, the ramp voltage generator in the output circuitry is identical to that in the input circuitry, resulting in a uniformity of performance. data samples and the ramp voltage are summed and the proper-going ramp voltage is chosen to establish the references of a level detecting circuit. An output data latching circuit is connected to the level detecting circuit, and is set or reset at the instant when the input terminal contains either one of the reference levels. The output of the data latch is thus a reproduction of the original data but delayed by one TDM switching period.

Thus, in order to reconstitute the original data, but three factors necessarily are established in the output interfacing circuit: the ramp, sample size, and the reference voltages of the level detecting circuit.

In order that the full advantage of the invention may be obtained in practice, preferred embodiments thereof, given by way of example only, are described in detail hereinafter with reference to the acccompanying drawing, forming a part of the specification, and in which.

Figure 1:
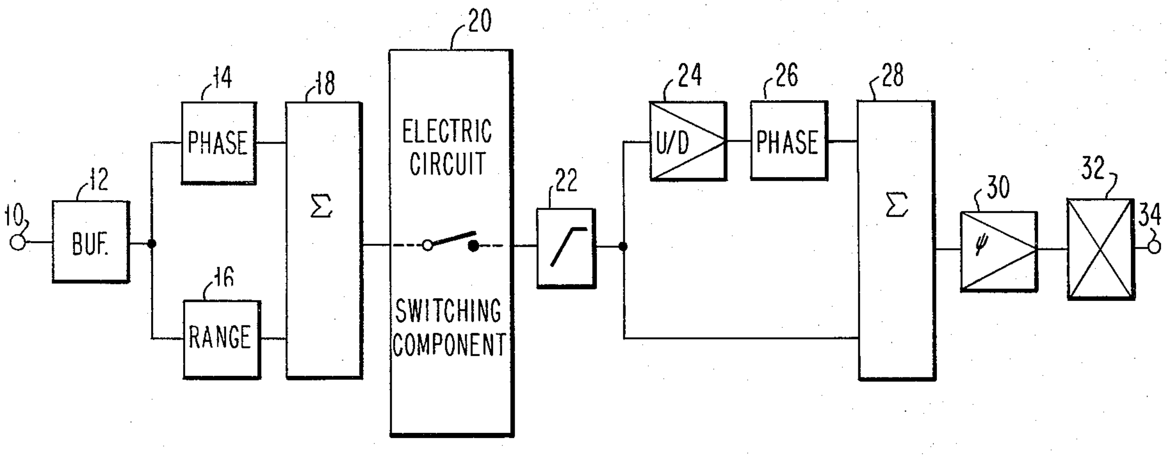
FIG. 1 is a functional diagram of fundamental circuitry according to the invention.

A functional diagram of circuitry for performing the general functions of digital electric signal switching systems according to the invention is laid out in FIG. 1. A communications transmission line is terminated at input terminals 10 of a buffering circuit 12. The output of the buffering circuit 12 is applied in parallel to a phase measuring circuit 14 and to a range determining circuit 16. Each signal transition encountering the latter circuits starts a measurement of phase relationship as by starting a ramp generating circuit or by starting a counting circuit, or the like, and determining whether the range of the phase measurement is positive or negative, or up or down, or higher or lower. The output voltages of the circuits 14 and 16 are selectively applied to a summing facility 18 where they are combined. The combined signal is then applied to and passed through an electric circuit switching component 20. The latter may be a conventional sampling type switch in all respects, but preferably it is arranged according to the teachings in the copending U.S. Pat. application, Ser. No. 475,682 After passing through the switching component 20, the signal is applied to a sample holding store 22 which also performs a buffering function. The output of the buffering circuit 22 is applied to a ranging detector circuit 24 for analyzing the operation of the ranging circuit 16 and thence to a phase measuring circuit 26 which functions as a complementary circuit to the phase measuring circuit 14. Phase information emanating from the measuring circuit 26 is applied to another summing facility 28 along with output directly from the buffering circuit 22. The output of the summing facility 28 is applied to a 360° phase detecting circuit 30 which is connected to digital latch 32. The latter latch 32 has an output circuit connected across output terminals 34 for matching a communications transmission line.

Figure 2:
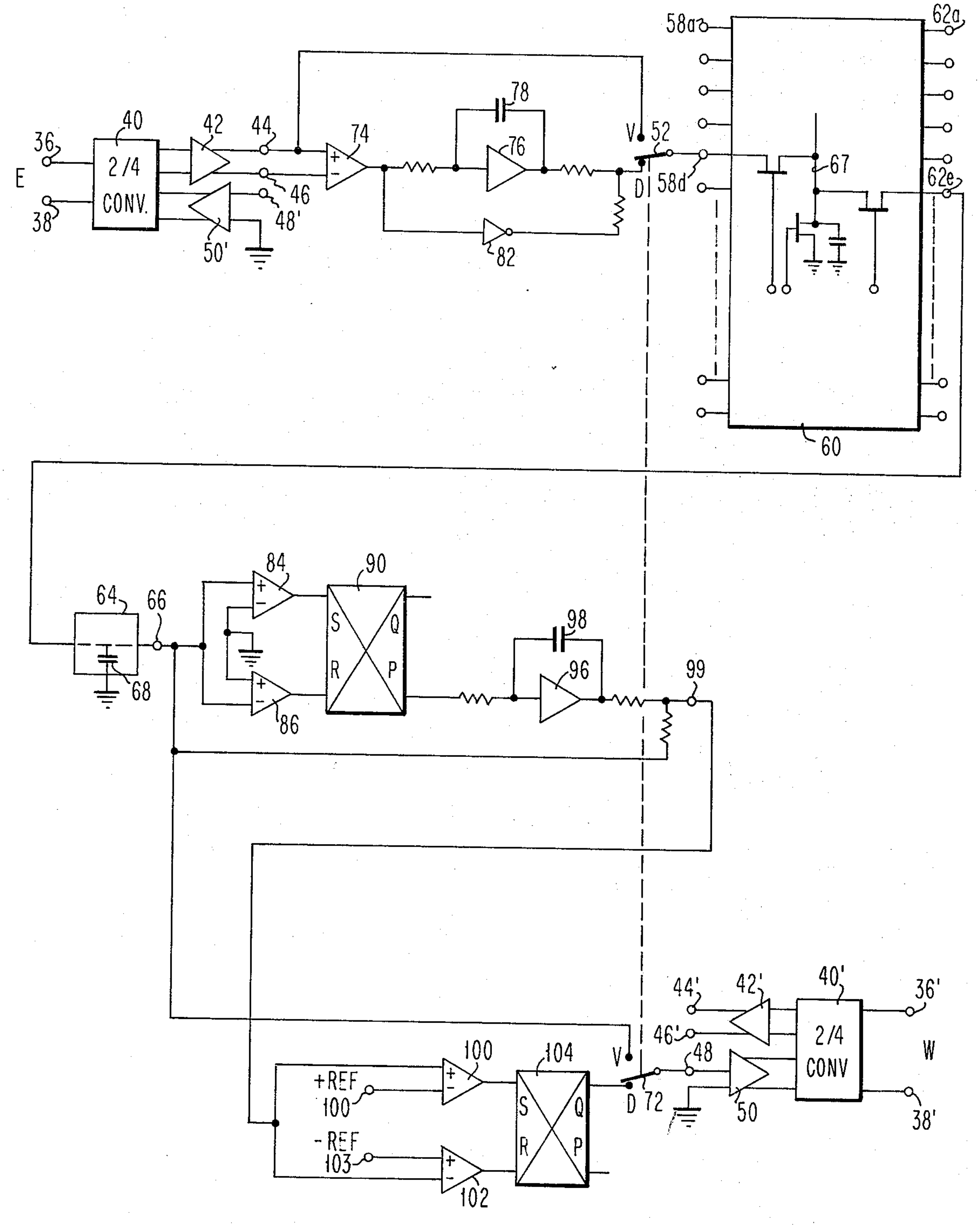
FIG. 2 is a functional diagram of a working embodiment of a time-division pulse-multiplex digital electric signal switching circuit arrangement according to the invention.

An embodiment of the invention specifically incorporating ramp voltage generating circuitry for imparting phase information according to the invention is shown in FIG. 2. A communications transmission line is terminated at input terminals 36, 38 of a conventional four-wire terminal set 40. An amplifying circuit 42 delivers incoming signals to a pair of terminals 44, 46 to be passed through an electric circuit switching facility and eventually delivered at terminal 48 of another four-wire terminal set 40'. After amplification in an amplifying circuit 50, signals are presented at line terminals 36' and 38' for application to another communications transmission line. The terminal 48' and the amplifying circuit 50' of the terminal set 40 correspond, as do the terminals 44', 46' and the amplifying circuit 42' of the terminal set 40'. For voice frequency signal transmission, a switch 52 is thrown to the upper contact which is connected to the terminal 44 for applying the voice frequency signal to one terminal, specifically the terminal **58*d*, of the electric circuit switching facility 60. One output terminal, specifically the terminal 62*e*, is connected to a sample-and-hold circuit 64 having an output terminal 66. A predominate capacitive reactance appearing at the terminal 62*e* due to the holding circuit 64 is represented by the symbol 68 in the interest of clarity. The terminal 66 is connected to the voice mode contact of a switch 72, simultaneously operated with the switch 52, for applying the output of the sample-and-hold circuit 64 to the terminal 48 of the terminal set 40'. Incoming voice signals on a fully duplex two-wire line are converted to a half-duplex four-wire line by the terminating set 40. The voice signals are then routed through the switch 52 to the time division multiplex/pulse amplitude modulation electric circuit switching facility 60. Essentially each switch point that is associated with a calling port is arranged to be connected to the input port for short intervals of time at a very high repetition rate. For example, a one microsecond sample may be taken every 128 microseconds. These amplitude samples appear as voltage levels on a common node bus 67 during the allotted sampling period. During the same sampling time slot, a switch point associated with the called line is closed to effect a connection from the common node bus 67 to a sample-and-hold circuit 64 in the called port. The sample-and-hold circuit 64 holds the amplitude of the received pulse during the interval between sampling time periods. The output of the overall circuitry is an approximate replica of the corrected input signal, except for high frequency components which are readily filtered out with conventional filter circuitry. A signal thus reproduced at the terminal 66 is routed through a switch 72 and a four-wire terminating set 40' to the called subscriber. The return conversation is set up in a similar manner using a different time slot and different switch connections of the electric circuit switching facility 60. The switching facility 60** is conventional in all respects but alternately, the circuitry in copending U.S. Pat. application, Ser. No. 475,682 is preferred. Control of the switching facility is preferably performed by a data processing unit which stores the addresses of calling and called subscribers, assigns the time slots to the switching channels, and provides control signals.

For digital data transmission, the switches 52 and 72 are set as shown for interposing phase angle measuring and analyzing circuitry into the system. Signals received by the four-wire terminating set 40 are interpreted as two-level digital signals by a differential amplifying circuit 74 having the input terminals connected to the terminals 44 and 46. The output of the amplifying circuit 74 is applied to a ramp generating circuit comprising an operational amplifier 76 and associated capacitor 78 and to an inverting circuit 82. The outputs of the ramp voltage generating circuit and the inverting circuit 82 are summed at the conjunction of the resistors connected to the switch contact 52. The output of the sample-and-hold circuit 64 at terminal 66 is applied to the positive and negative terminals of two different comparator circuits 84 and 86 and to a summing node 99. The output terminals of these comparator circuits are individually connected to a bilateral flip-flop circuit 90 for either setting or resetting the latter at each sampling. The inverted output of the flip-flop circuit 90 is applied to a ramp generating circuit comprising an operational amplifier 96 and capacitor 98. The output of this circuit is summed with the sample and hold signal at the junction of the resistors 99 for application to another pair of comparator circuits 100 and 102 which perform a 360° phase detecting function. Comparator 100 generates an input to the bilateral flip-flop circuit 104 whenever the voltage at 99 becomes more positive than the voltage +REF, while comparator 102 generates another input whenever the voltage at 99 becomes more negative than the reference voltage. The direct output terminal of bilateral flip-flop circuit 104 is connected to the contact of the switching 72.

Figure 3:
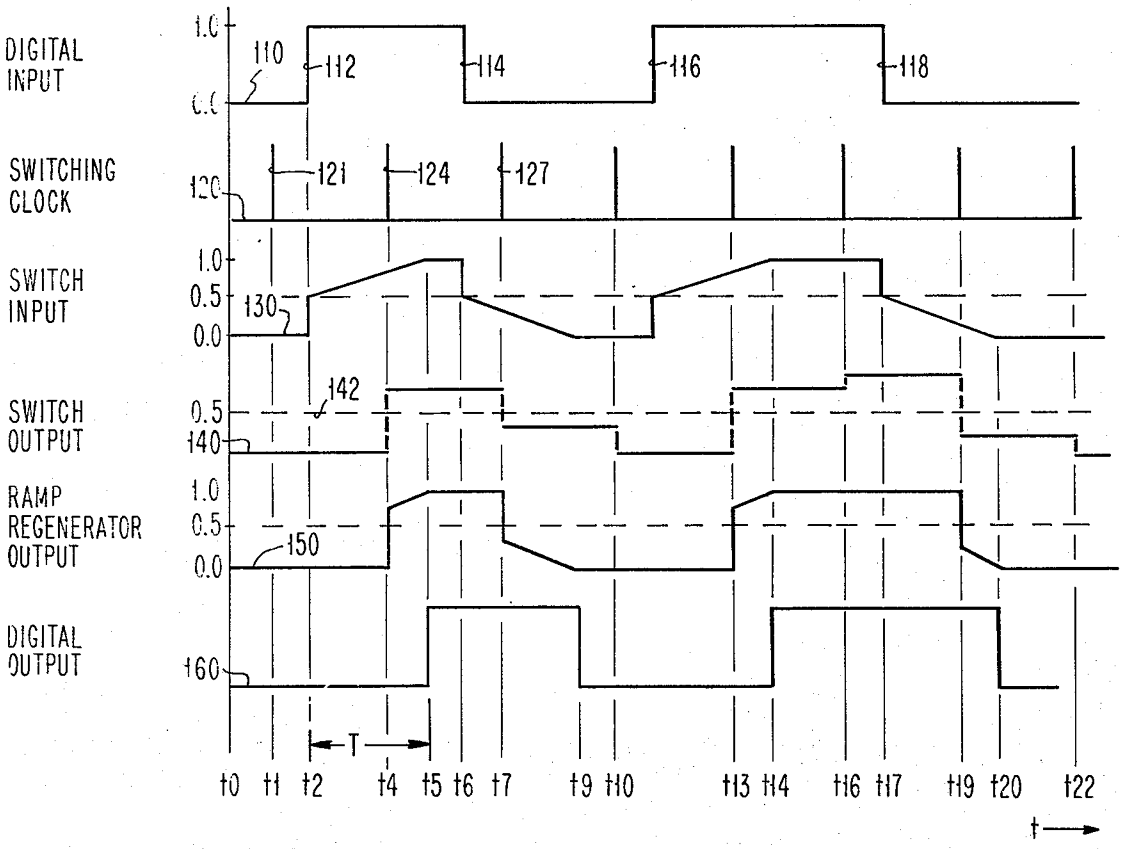
FIG. 3 is a graphical representation of waveforms useful in an understanding of the operation of the circuit arrangement depicted in FIG. 2.

Waveforms obtainable at pertinent points in the circuitry of the latter embodiment are graphically represented with respect to a common time reference in FIG. 3. These curves are in idealized from in the interest of clarity. A digital data PDM waveform is represented graphically by a curve 110. The level-to-level transitions 112, 114, 116, and 118 are asynchronous to a TDM clocking pulse train graphically represented by a curve 120. The first clock pulse 121 is represented as occurring at time $t_1$ and the second clock pulse 124 is presented as occurring at time $t_4$, one clock period unit later, and so on. The input wave to the electric circuit switching facility 60, specifically at the terminal **58*d* in the illustrative example, is represented by a curve 130. This waveform is the sum of two components. One of these components is a portion of the digital input waveform of curve 110, at one-half of the amplitude of the full PDM signal in the example given. This component is used to convey the range assignment through the electric circuit switching facility 60. Signals at the output terminals 62*e* of the switching facility 60 which are in the upper half of the range are an indication that the digital output is going positive or upward. Signals at the terminal 62*e* which are in the lower half of the range indicate that the digital output is going downward or negative. The other component of the waveform of curve 130 is a ramp voltage component. This ramp voltage component is initiated at the time of each transition 112, 114, 116, 118, and so forth, of the input waveform of curve 110. This ramp voltage component has an upward slope for upward-going transitions of the input wave and has a downward slope for downward-going transitions of the input wave. The slope of the ramp components of the wave is such that the amplitude of the ramp changes by one-half, in the example given, of the PAM signal range in the time equal to the TDM clock period T. The ramp wave components extend only until the limits of amplitude are reached. The values of 0.0, 0.5, and 1.0 in curve 130 are relative and chosen in the interests of clarity. This ramp voltage component serves as a phase timing indicator in that the amplitude at the time of the next TDM sample is proportional to the phase difference between the input transition, say the transition 112, and the next TDM sample pulse, that is, pulse 124. The output potential at the terminals 66 is represented by a discontinuous curve 140 swinging about a reference level 0.5, indicated by a reference dashed line 142. This curve 140 is a representation of levels which the sample-and-hold circuitry 64 holds on each successive sampling of the switching terminals. The regenerated signal wave at intermediate terminal 99 is represented by a curve 150. This wave 150 comprises two component waves. One of these component waves is a proportion of the amplitude of the received signal waveform of curve 140, while the other component is a ramp voltage wave with the same rate of change and direction of slope as in the ramp voltage components used to generate the waveform shown in curve 130. The duration and final amplitude of the regenerated ramp voltage components are not necessarily the same as the originating components; in fact, they seldom are. The regenerated ramp voltages are initiated by operation of the range signal detector formed by two comparator ciruits 84, 86, and a bilateral flip-flop circuit 90 for the embodiment illustrated. If the received signal is passed through the electric circuit switching facility 60 is in the opposite range from that of the preceeding TDM sample, the slope is negative if the transition was negative, and positive if the transition was positive. The output waveform reaches a maximum up or maximum down level in synchronism with the input waveform and a point in time lagging the digital input transitions by 360° as represented by the curve 160. The attainment of this maximum up or maximum down level is detected by a full period signal detector (or 360° detection circuit) comprising two comparators 100 and 102 and a bilateral flip-flop circuit 104. The +REF voltage at terminal 101 is set equal to the 1.0 point on waveform 150 and the −REF voltage at terminal 103 is set equal to the 0.0 point on waveform 150. This causes the bilaterial flip-flop circuit 104 to switch the digital output level to form an output wavefrom 160** which is a replica of the input digital waveform delayed in time by one TDM sample period T.

It is a feature of the invention that the range information sent through the electric circuit switching facility gives a positive indication of the input level at the time of every TDM sample, whether a transition has occurred in the input wave since the previous TDM sample. Consequently, if a transition is missed because of noise or hardware failure, the system will be resynchronized by a subsequent TDM sample with normal operation thus restored.

The above-mentioned copending U.S. Pat. application, Ser. No. 475,682 is directed to an electric circuit switching facility having a capability wherein bandwidth can be assigned as a variable quantity by adjusting the TDM sampling rate to meet the requirements of the subscribers. The present invention is operated in such an environment by changing the slope of the ramp voltages generated to correspond to the various switching rates. Preferably, the switching rate generating circuits and the ramp voltage generating circuits are basically identical solid state devices connected into overall circuitry for performing the different function cooperatively whereby compatible operation is readily achieved.

Figure 4:
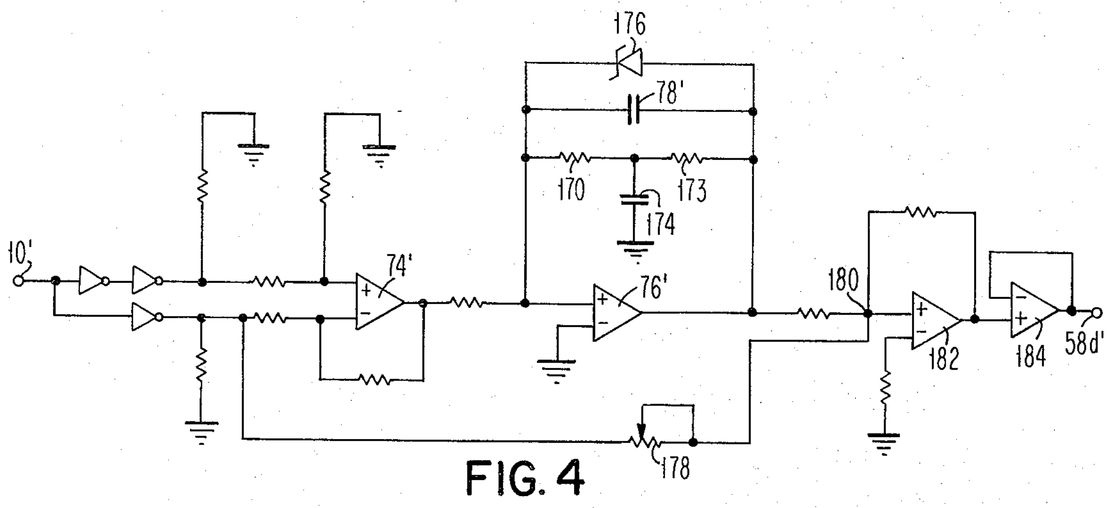
FIGS. 4 and 5 are schematic diagrams of specific circuitry for operating input and output circuitry according to the invention.
Figure 5:
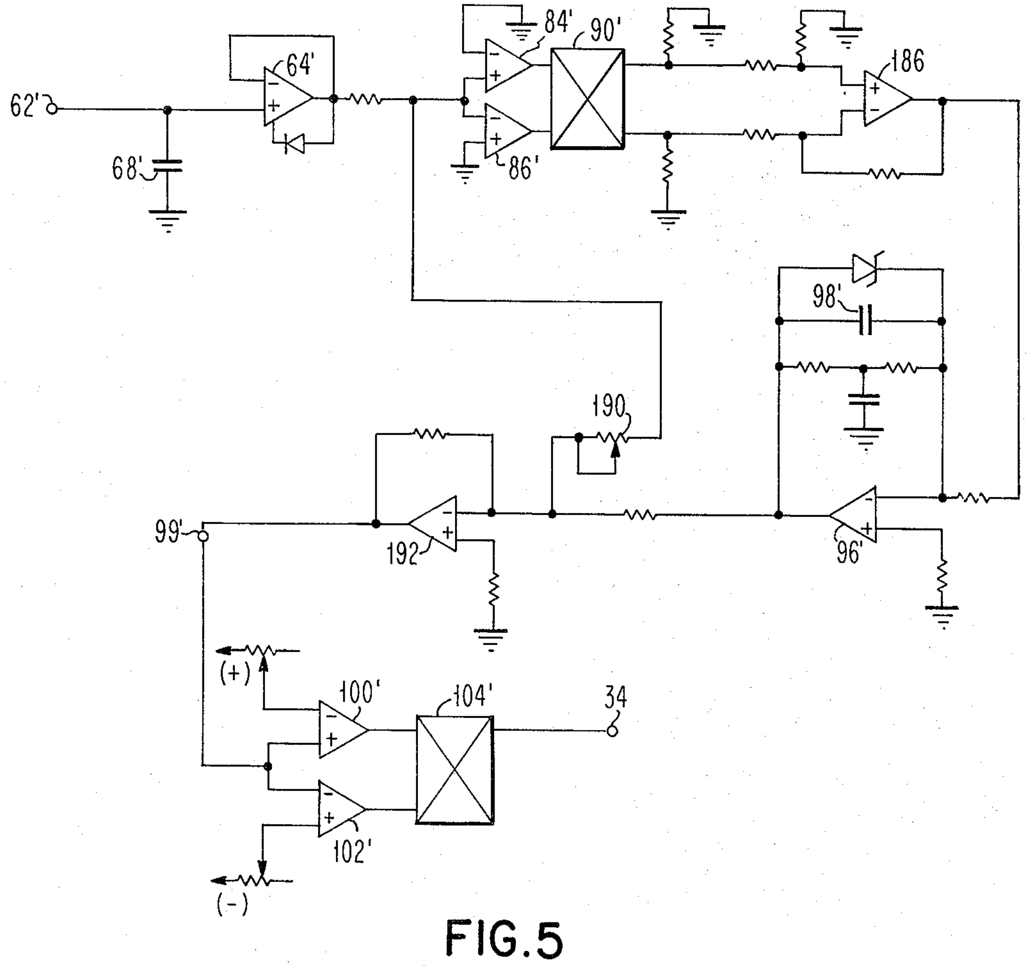

Model circuitry, according to the invention, is operated at a PDM digital data rate of 50 KHz with a TDM clock rate of 64 KHz before noticeable jitter is observed in the output waveform. FIG. 4 is a schematic diagram of the input interface of this model circuitry. Digital data is applied at input terminals 10′ and converted to equal positive and negative data signals at the output of a differential amplifying circuit 74′ operating as a comparator. An operational amplifier 76′ together with a capacitor 78′ forms a ramp voltage wave generating circuit. A filter comprising resistors 170 and 173 and a capacitor 174 serves to eliminate a step function wavering of the waveform. A ramp amplitude limiting diode 176 completes the circuit. The input waveform is attenuated by an adjustable resistor 178 for summing with the output of the ramp voltage generating circuit at a junction terminal 180 connected to an operational amplifier 182. A switch driver circuit 184 couples the output of the operational amplifier circuit 182 to switch terminals **58*d*′. The output interfacing circuitry is shown in the schematic diagram of FIG. 5. The waveform emanating from the electric circuit switching facility appears at terminals 62′ leading to the positive terminal of a differential amplifying circuit 64′ which with a capacitor 68′ forms a sample-and-hold circuit. Two comparator circuits 84′ and 86′ detect the zero-crossing points of the data samples for setting and resetting a data latch 90′ accordingly. An operational amplifier circuit 186 connected to the latch or flip-flop 90′ converts the flip-flop outputs to equal positive and negative data signals for application to a ramp generator comprising a differential amplifier 96′ and a capacitor 98′ connected in a circuit substantially identical to that of the previous ramp generating circuit of the input interfacing circuit. The output of the amplifying circuit 64′ is attenuated by an adjustable resistor 190 and summed at terminal 99′ with the output of differential amplifier 96′ for summing with the output of amplifier 96′ before it is applied to an operational amplifier 192. The output of the amplifier 192 is applied to a level detector comprising comparator circuits 100′ and 102′ which are connected to a set-and-reset data latch 104′ comprising a bilateral flip-flop circuit. The output of the flip-flop circuit 104′ is applied to the output terminals 34′** for delivering the original data delayed by one sampling period T.

Thus, original data is recaptured after passing the message through the electric circuit switching facility in response to three information variables: (1) the duration of the ramp, (2) the size of the sample, and (3) the reference voltages of the level detector. Synchronization (in the usual sense) with the switching facility is then actually unnecessary.

While the invention has been shown and described particularly with reference to preferred embodiments thereof, and various alternatives have been suggested, it should be understood that those skilled in the art may affect still further changes without department from the spirit and scope of the invention as defined hereinafter.

The invention claimed is:

1. A time-division pulse-multiplex digital electric signal switching circuit arrangement of the type having an electric signal switching component through which an electric signal is translated by interconnecting switching input and output terminals for a predetermined portion only of a time cycle, comprising

- input terminals at which a pulse coding modulated electric signal wave is applied,
- output terminals at which a regenerated pulse coding modulated electric signal wave is delivered in substantially the same form as that of said electric signal wave applied at said input terminals,
- a circuit coupled between said signal input terminals and said switching input terminals having circuitry for driving a component electric wave of polarity and amplitude proportional to the amplitude of said signal wave, circuitry for deriving a component electric wave of amplitude value representative of the time relationship of the transistions in said electric signal wave to said time cycle of said switching component and circuitry for summing the amplitudes of said component electric waves, and
- a circuit coupled between said switching output terminals and said signal output terminals having circuitry responsive to said summed component waves for regenerating said electric signal wave.

2. A time-division pulse-multiplex digital electric signal switching circuit arrangement of the type having an electric signal switching component through which an electric signal is translated by interconnecting switching input and output terminals for a predetermined portion only of a time cycle, comprising

- input terminals at which a pulse coding modulated electric signal wave is applied,
- output terminals at which a regenerated pulse coding modulated electric signal wave is delivered in substantially the same form as that of said electric signal wave applied at said input terminals, a circuit coupled between said signal input terminals and said switching input terminals having circuit for deriving a component electric wave of amplitude proportional to the amplitude of said signal wave, ramp voltage wave generating circuitry for deriving a component electric wave of value representative of the time relationship of the transitions in said electric signal wave to said time cycle of said switching component and circuitry for summing said component electric waves, and a circuit coupled between said switching output terminals and said signal output terminals having circuitry responsive to said summed component waves for regenerating said electric signal wave.

3. A time-division pulse-multiplex digital electric signal switching circuit arrangement of the type having an electric signal switching component through which an electric signal is translated by interconnecting switching input and output terminals for a predetermined portion only of a time cycle, comprising input terminals at which a pulse coding modulated electric signal wave is applied, output terminals at which a regenerated pulse coding modulated electric signal wave is delivered in substantially the same form as that of said electric signal wave applied at said input terminals, a circuit coupled between said signal input terminals and said switching input terminals having digital circuitry for deriving a component electric wave of polarity and amplitude proportional to the amplitude of said signal wave, digital counting circuitry arranged for establishing the amplitude value representative of the time relationship of the transitions in said electric signal wave to said time cycle of said switching component, and circuitry for summing said component electric waves, and a circuit coupled between said switching output terminals and said signal output terminals having circuitry responsive to said summed component waves for regenerating said electric signal wave.

4. A time-division pulse-multiplex digital electric signal switching circuit arrangement of the type having an electric signal switching component through which an electric signal is translated by interconnecting switching input and output terminals for a predetermined portion only of a time cycle, comprising input terminals at which a pulse coding modulated electric signal wave is applied, output terminals at which a regenerated pulse coding and modulated electric signal wave is delivered in substantially the same form as that of said electric signal wave applied at said input terminals, a circuit coupled between said signal input terminals and said switching input terminals having circuitry for deriving a component electric wave of amplitude proportional to the amplitude of said signal wave, circuitry for deriving a component electric wave of value representative of the time relationship of the transitions in said electric signal wave to said time cycle of said switching component and circuitry for summing said component electric waves, and a circuit coupled between said switching and said signal output terminals having the same time relationship deriving circuitry as that in said circuit coupled between said signal input and said switching input terminals responsive to said summed component waves for regenerating said electric signal wave.

5. A time-division pulse-multiplex digital electric signal switching circuit arrangement of the type having an electric signal switching component through which an electric signal is translated by interconnecting switching input and output terminals for a predetermined portion only of a time cycle, comprising input terminals at which a pulse coding modulated electric signal wave is applied, output terminals at which a regenerated pulse coding modulated electric signal wave is delivered in substantially the same form as that of said electric signal wave applied at said input terminals, a circuit coupled between said signal input terminals and said switching input terminals having circuitry for deriving a component electric wave of amplitude proportional to the amplitude of said signal wave, circuitry for deriving a component electric wave of value representative of the time relationship of the transitions in said electric signal wave to said time cycle of said switching component and circuitry for summing said component electric waves, and a circuit coupled between said switching output terminals and said signal output terminals having circuitry for deriving component electric wave of amplitude proportional to the amplitude of said wave, circuitry for deriving a component wave of value representative of the time relationship of the impulses of said time cycle for summing said component electric waves, thereby regenerating the transitions in said electric signal wave and regenerating said electric signal wave delayed by one said time cycle.

6. A time-division pulse-multiplex digital electric signal switching circuit arrangement of the type having an electric signal switching component through which an electric signal is translated by interconnecting switching input and output terminals for a predetermined portion only of a time cycle, comprising input terminals at which a bistatic electric signal wave is applied, output terminals at which a regenerated bistatic electric signal wave is delivered in substantially the same form as that if said electric signal wave applied at said input terminals, a ramp voltage wave generating circuit having an input terminal coupled to the first said input terminals and having an output terminal, an electric wave inverting circuit having an input terminal coupled to the first said input terminals and having an output terminal, summing circuitry connecting said output terminals of said ramp voltage wave generating circuit and said electric wave inverting circuit to said electric switching components, a sample-and-hold circuit having an input terminal connected to said electric circuit switching component and having an output terminal, a pair of differential amplifying circuits having input terminals of opposite polarity connected in common to said output terminal of said sample-and-hold circuit and having output terminals, a bilateral flip-flop circuit having set and reset terminals individually connected to said output terminals of said pair of differential amplifying circuits and having erect and inverted output terminals, another ramp voltage wave generating circuit having an input terminal connected to one of said output terminals of said bilateral flip-flop circuit, other summing circuitry connected to said output terminal of said other ramp voltage wave generating circuit and to said output terminal of said sample-and-hold circuit and having a common terminal, another pair of differential amplifying circuits having input terminals of opposite polarity connected in common to said common terminal of said other summing circuitry and having output terminals connected individually to set and reset terminals, another bilateral flip-flop circuit having set and reset terminals connected individually to said output terminals of said other pair of differential amplifying circuits and having erect and inverted output terminals, and circuitry connecting one of said output terminals of said other bilateral flip-flop circuit to the first said output terminals.

7. A time-division pulse-multiplex digital electric signal switching circuit arrangement as defined in claim 6 and wherein, at least one of said ramp voltage wave generating circuits comprises an operational amplifying circuit and a capacitor connected from the output terminal to the input terminal of said operational amplifying circuit.

8. A time-division pulse-multiplex digital electric signal switching circuit arrangement as defined in claim 6 and wherein said other summing circuitry is connected to the output terminal of the sample-and-hold circuit.

9. A time-division pulse-multiplex digital electric signal switching circuit arrangement as defined in claim 6 and wherein said ramp voltage wave generating circuits are substantially identical.

10. A time-division pulse-multiplex digital electric signal switching circuit arrangement as defined in claim 6 and werein electric switch means are arranged for providing a direct connection from the first said input terminals to said electric switch component, and a direct connection from said output terminal of said sample-and-hold circuit to the first said output terminals, whereby electric voice frequency wave signal is translated through said electric switch component.

* * * * *